(12) United States Patent
Lereya et al.

(10) Patent No.: US 10,929,793 B2
(45) Date of Patent: Feb. 23, 2021

(54) UTILIZING ANALYTIC DATA TO GENERATE CROWD-BASED CUSTOM LOGIC UNITS

(71) Applicant: International Business Machines Corporation, Armonk, NY (US)

(72) Inventors: Daniel Lereya, Tel Aviv-Jaffa (IL); Nadav Parag, Rehovot (IL); Vladimir Shalikashvili, Petah Tiqwa (IL); Moshe Weiss, Petah Tiqwa (IL)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 15/668,275

(22) Filed: Aug. 3, 2017

(65) Prior Publication Data

US 2019/0042994 A1   Feb. 7, 2019

(51) Int. Cl.
  *G06Q 10/06*  (2012.01)
  *G06Q 10/10*  (2012.01)
  *G06F 16/13*  (2019.01)
  *G06F 16/23*  (2019.01)
  *G06F 16/435*  (2019.01)

(52) U.S. Cl.
  CPC ....... *G06Q 10/06315* (2013.01); *G06F 16/13* (2019.01); *G06F 16/23* (2019.01); *G06F 16/435* (2019.01); *G06Q 10/10* (2013.01)

(58) Field of Classification Search
  CPC .......... G06Q 10/06315; G06Q 10/10; G06F 16/435; G06F 16/23
  See application file for complete search history.

(56) References Cited

U.S. PATENT DOCUMENTS

| 8,515,801 | B2* | 8/2013 | Guthrie | G06Q 10/0639 |
| | | | | 705/7.38 |
| 8,751,948 | B2* | 6/2014 | Wetzer | G06F 9/542 |
| | | | | 715/769 |
| 8,909,202 | B2 | 12/2014 | Luna et al. | |
| 9,292,577 | B2* | 3/2016 | Friedlander | G06F 16/2465 |

(Continued)

OTHER PUBLICATIONS

Lukyanenko, Roman, et al. "Representing crowd knowledge: Guidelines for conceptual modeling of user-generated content." Journal of the Association for Information Systems 18.4 (2017): 2. (Year: 2017).*

(Continued)

*Primary Examiner* — Matthew S Gart
*Assistant Examiner* — Hamzeh Obaid
(74) *Attorney, Agent, or Firm* — Francis Lammes; Stephen J. Walder, Jr.; Robert M. Sullivan

(57) ABSTRACT

A mechanism is provided for generating crowd-based custom logic units for use in storage management. Responsive to receiving analytic data from a set of storage device managers about how users interact with the set of storage device managers, the analytics data is analyzed in order to gain one or more insights into how users interact with the set of storage device managers. One or more logic units are then generated utilizing the one or more insights. The one or more logic units are then sent to one or more storage device managers in the set of storage device managers in order that the users of the one or more storage device managers utilize the one or more logic units to perform their daily tasks more efficiently.

20 Claims, 3 Drawing Sheets

(56) References Cited

U.S. PATENT DOCUMENTS

| | | | |
|---|---|---|---|
| 9,311,176 B1* | 4/2016 | Khokhar | G06F 11/0766 |
| 9,503,349 B2 | 11/2016 | Slovacek | |
| 10,169,121 B2* | 1/2019 | Vibhor | H04L 67/10 |
| 2007/0022122 A1* | 1/2007 | Bahar | H04L 67/1095 |
| 2007/0168501 A1 | 7/2007 | Cobb et al. | |
| 2012/0209654 A1* | 8/2012 | Romagnino | G16H 40/20 |
| | | | 705/7.27 |
| 2013/0212154 A1* | 8/2013 | Lehto | H04L 67/42 |
| | | | 709/203 |
| 2014/0074540 A1* | 3/2014 | Evans | H04L 67/10 |
| | | | 705/7.25 |
| 2015/0056964 A1 | 2/2015 | Williams et al. | |
| 2015/0286495 A1* | 10/2015 | Lee | G06F 16/38 |
| | | | 718/102 |
| 2016/0105565 A1 | 4/2016 | Conway et al. | |

OTHER PUBLICATIONS

"System and Method for Enhanced Interaction with Interactive Voice Response System Using SIP and Presence Server Technology", Disclosed Anonymously, An IP.com Prior Art Database Technical Disclosure, IPCOM000210406D, Sep. 2, 2011, 6 pages.

\* cited by examiner

UTILIZING ANALYTIC DATA TO GENERATE CROWD-BASED CUSTOM LOGIC UNITS

BACKGROUND

The present application relates generally to an improved data processing apparatus and method and more specifically to mechanisms for utilizing analytic data to generate crowd-based custom logic units for use in storage management.

Memory management is a form of resource management applied to computer memory. The essential requirement of memory management is to provide ways to dynamically allocate portions of memory to programs at their request, and free it for reuse when no longer needed. This is critical to any advanced computer system where more than a single process might be underway at any time. Several methods have been devised that increase the effectiveness of memory management. Virtual memory systems separate the memory addresses used by a process from actual physical addresses, allowing separation of processes and increasing the size of the virtual address space beyond the available amount of RAM using paging or swapping to secondary storage. The quality of the virtual memory manager can have an extensive effect on overall system performance.

Storage device managers provide policy-based management of file backup and archiving in a way that uses storage devices economically and without the user needing to be aware of when files are being retrieved from backup storage media. Although storage device managers may be implemented on a standalone system, more frequently storage device managers are used in the distributed network of an enterprise. The hierarchy represents different types of storage media, such as redundant array of independent disks systems, optical storage, or tape, each type representing a different level of cost and speed of retrieval when access is needed. For example, as a file ages in an archive, it can be automatically moved to a slower but less expensive form of storage. Using storage device managers, an administrator may establish and state guidelines for how often different kinds of files are to be copied to a backup storage device. Once the guideline has been set up, the storage device managers manage everything automatically.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for generating crowd-based custom logic units for use in storage management. The illustrative embodiment analyzes analytics data in order to gain one or more insights into how users interact with a set of storage device managers in response to receiving the analytic data from the set of storage device managers about how users interact with the set of storage device managers. The illustrative embodiment generates one or more logic units utilizing the one or more insights. The illustrative embodiment send the one or more logic units to one or more storage device managers in the set of storage device managers in order that the users of the one or more storage device managers utilize the one or more logic units to perform their daily tasks more efficiently.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
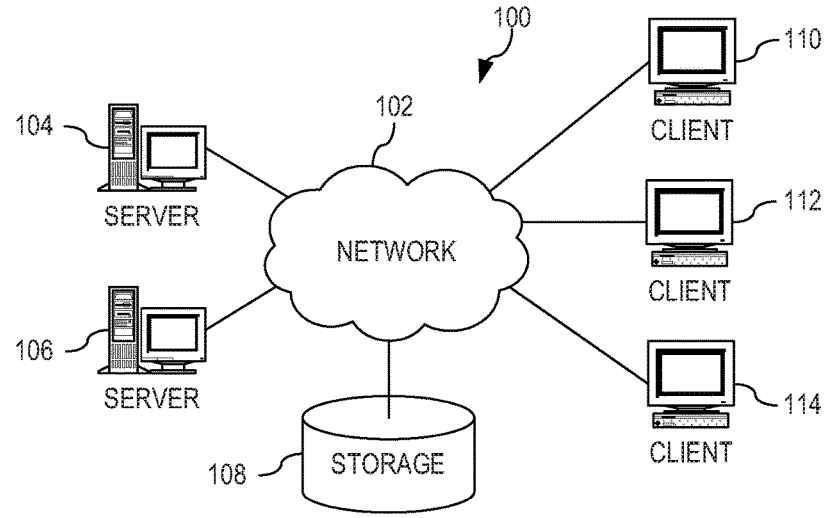
FIG. 1 is an example diagram of a distributed data processing system in which aspects of the illustrative embodiments may be implemented.

The illustrative embodiments provide mechanisms for utilizing analytic data to generate crowd-based custom logic units for use in storage management. Storage device managers, such as the IBM® Hyper Scale Manager (HSM), have the ability to collect analytic data about how users use the storage device manager for performing their daily tasks. Aggregating and crunching such analytics data may result in general insights that may help other users around to world to perform their daily tasks more efficiently, learn new ways to manage their storage, get "out of the box" automation based on other users activities, or the like. Thus, the mechanisms of the illustrative embodiment utilize analytics data to generate crowd-based custom logic units for use by other in their storage management. That is, the mechanisms analyze the analytics data gathered from a plurality of users using storage device managers in order to gain community insights. Using the community insights, the mechanisms generate community knowledge-based procedures, herein after referred to as "Logic Units" that are then integrated back into the storage device managers as plugins. These plugins may then be searched by the user of the storage device manager to perform their daily tasks more efficiently.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
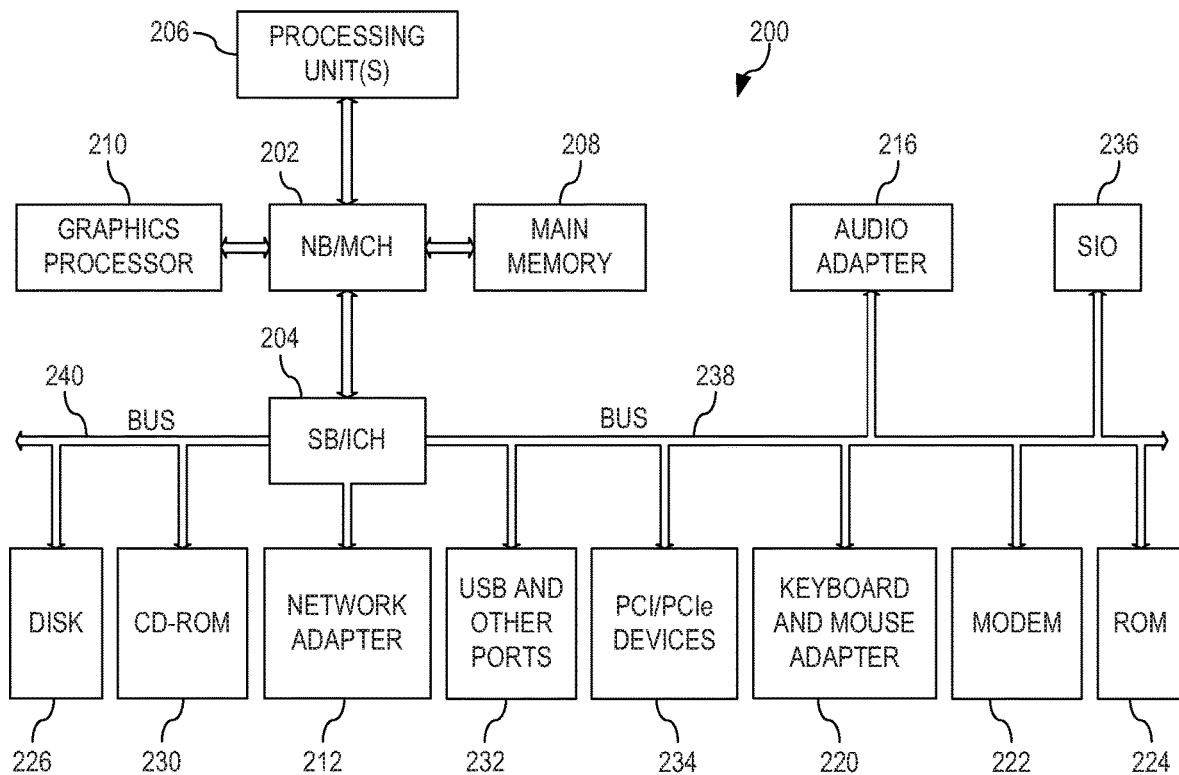
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a mechanism for utilizing analytic data to generate crowd-based custom logic units for use in storage management. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates utilizing analytic data to generate crowd-based custom logic units for use in storage management.

As noted above, the mechanisms of the illustrative embodiments utilize specifically configured computing devices, or data processing systems, to perform the operations for utilizing analytic data to generate crowd-based custom logic units for use in storage management. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer® System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to utilizing analytic data to generate crowd-based custom logic units for use in storage management.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
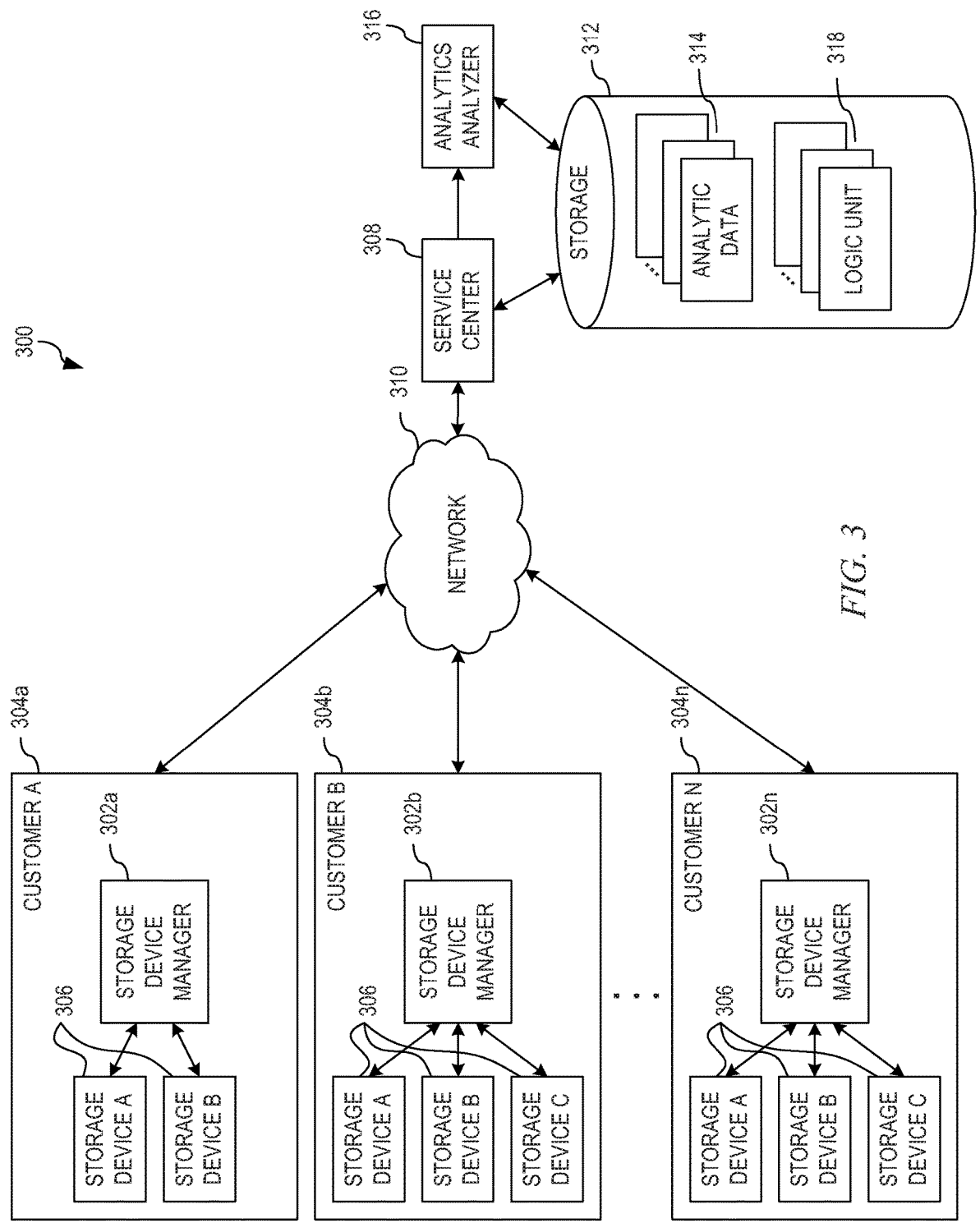
FIG. 3 depicts a functional block diagram of a mechanism that utilizes analytic data to generate crowd-based custom logic units for use in storage management in accordance with an illustrative embodiment.

FIG. 3 depicts a functional block diagram of a mechanism that utilizes analytic data to generate crowd-based custom logic units for use in storage management in accordance with an illustrative embodiment. Distributed data processing system 300 comprises a plurality of storage device managers 302a-302n each associated with a respective customer 304a-304n. Each storage device manager of the plurality of storage device managers 302a-302n manages one or more storage devices 306 and collects analytic data about how users use their respective storage device manager 302 for performing tasks with their respective storage devices 306 in order to obtain results. The analytic data may include, for example, all interactions with the storage device manager performed by the user and the results that obtained based on the interactions, which would allow for mimicking the same interactions on one or more other unrelated systems. For example, recording each mouse click, keyboard entry, or other peripheral input, such as those utilized in, for example, adding values to fields, navigating the application, or the like.

As each storage device manager of the plurality of storage device managers 302a-302n identifies such analytic data, the storage device manager send the data to service center 308 via network 310 using, for example, existing call-home mechanisms. Service center 308 stores the received data in storage 312 as analytic data 314. Upon receiving and storing analytic data 314, service center 308 sends a request to analytics analyzer 316 to analyze analytic data 314 in order to product one or more logic units 318. It should be noted that, in accordance with the illustrative embodiments, service center 308 and analytics analyzer 316 may be considered one mechanism. Analytics analyzer 316 aggregates and crunches analytics data 314 in order to gain general insights into how users interact with the storage device manager to obtain a result. For example, analytics analyzer 316 may group all pieces of the analytic data based on the result that was obtained. Using the result as a basis, analytics analyzer 316 identifies the various interactions or steps that were used to obtain the result and group those interactions or steps that are the same together. For example, for a result A there is ten pieces of data identifies as obtaining the same result A. Of the ten pieces of data, five utilized steps A-B-C, two utilized steps A-B-D-E, two utilized A-B-D-C, and one utilized steps A-B-D-F. Based on this analysis, analytics analyzer 316 identifies the steps of A-B-C as being the most optimal means of obtaining the result as the steps A-B-C are the fewest and the most widely utilized, i.e. 50 percent of the time. Utilizing these insights, analytics analyzer 316 generates a logic unit 318, which may be a plug-in, plugin, add-in, addin, add-on, addon, or other extension that is a software component that adds a specific feature to an existing computer program, i.e. the storage device manager.

Thus, analytics analyzer 316 generates logic units 318 in order to help other users of storage device managers to perform their daily tasks more efficiently, learn new ways to manage their storage, get "out of the box" automation based on other user's activities, or the like. Some example the analysis used by analytics analyzer 316 and the produced logic unit 318 may be, for example:

Detecting common usage patterns and generating a logic unit that adds the usage pattern as tips, dynamically generated guided processes, or the like.

Identifying user characteristics and other similar user's history and generating a logic unit that suggests default values for actions parameters based on the user characteristics and other similar users history.

As in the example above, analyzing different methods/routes that obtain the same result and find the optimal ones, then generate a logic unit that utilizes the optimal method/route.

Identify common cases and responses, such as a user mapped a specific volume and generate a logic unit that maps the same volume based on the data that a predetermined percent of the user mirrored their volumes right after mapping.

Take common actions blocks that perform the same flow (based on the user activities in the storage device manager that can be fully mimicked given the analytics data) and generate a logic unit that incorporates the common actions blocks on storage device manager for users with similar properties and characteristics.

Once analytics analyzer 316 generates a logic units 318, service center 308 makes the logic units 318 available to the user of the plurality of storage device managers 302a-302n. Depending on the setting of the particular storage device manager 302, in one embodiment, service center 308 may push the logic units 318 to the storage device manager 302 and notify the user that the logic units 318 are available to user to obtain a certain result. In another embodiment, service center 308 may notify the user of the storage device manager 302 that new logic units 318 are available and then the user may select particular one of logic units 318 that are most applicable to the user to download to their storage device manager 302.

Either way, the mechanisms of the illustrative embodiment utilize analytics data to generate crowd-based custom logic units for use by other in their storage management. That is, the mechanisms analyze the analytics data gathered from a plurality of users using storage device managers in order to gain community insights. Using the community insights, the mechanisms generate community knowledge-based procedures, herein after referred to as "Logic Units" that are then integrated back into the storage device managers as plugins. These plugins may then be searched by the user of the storage device manager to perform their daily tasks more efficiently.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
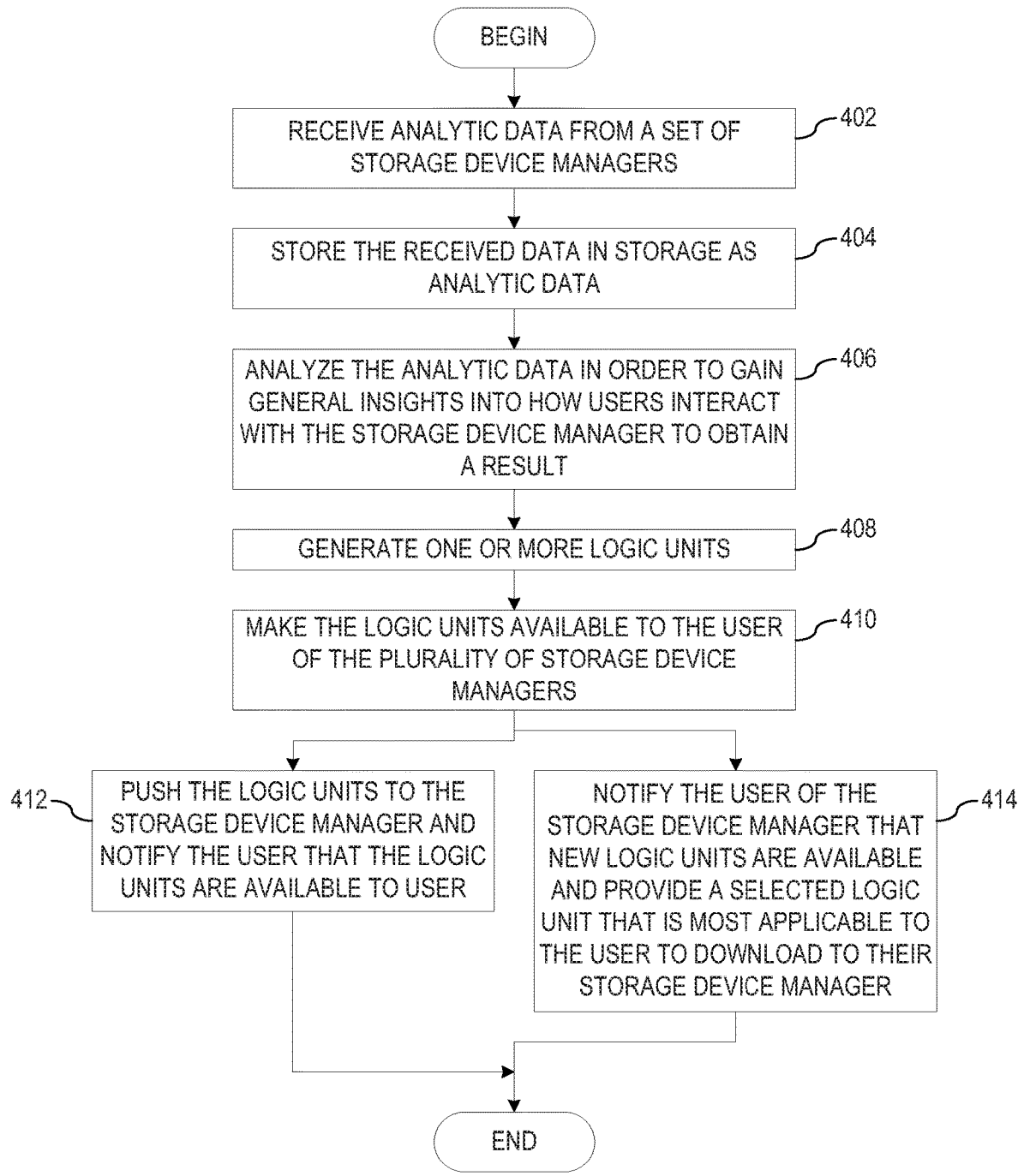
FIG. 4 depicts one exemplary flow diagram of the operation performed by a mechanism that utilizes analytic data to generate crowd-based custom logic units for use in storage management in accordance with an illustrative embodiment.

FIG. 4 depicts one exemplary flow diagram of the operation performed by a mechanism that utilizes analytic data to generate crowd-based custom logic units for use in storage management in accordance with an illustrative embodiment. As the operation begins, the mechanism receives analytic data from a set of storage device managers about how users use their respective storage device manager for performing tasks with their respective storage devices in order to obtain results (step 402). The analytic data may include, for example, all interactions with the storage device manager performed by the user and the results that obtained based on the interactions, which would allow for mimicking the same interactions on one or more other unrelated systems. For example, recording each mouse click, keyboard entry, or other peripheral input, such as those utilized in, for example, adding values to fields, navigating the application, or the like. The mechanism stores the received data in storage as analytic data (step 404).

The mechanism then analyzes the analytic data by aggregating and crunching the analytics data in order to gain general insights into how users interact with the storage device manager to obtain a result (step 406). For example, the mechanism may group all pieces of the analytic data based on the result that was obtained and, using the result as a basis, the mechanism may, for example:

Detect common usage patterns and generate a logic unit that adds the usage pattern as tips, dynamically generated guided processes, or the like.

Identify user characteristics and other similar user's history and generate a logic unit that suggests default values for actions parameters based on the user characteristics and other similar users history.

Analyze different methods/routes that obtain the same result and find the optimal ones, then generate a logic unit that utilizes the optimal method/route.

Identify common cases and responses, such as a user mapped a specific volume and generate a logic unit that maps the same volume based on the data that a predetermined percent of the user mirrored their volumes right after mapping.

Take common actions blocks that perform the same flow (based on the user activities in the storage device manager that can be fully mimicked given the analytics data) and generate a logic unit that incorporates the common actions blocks on storage device manager for users with similar properties and characteristics.

Utilizing these insights, the mechanism generates one or more logic units (step 408), which may be a plug-in, plugin, add-in, addin, add-on, addon, or other extension that is a software component that adds a specific feature to an existing computer program, i.e. the storage device manager. Once the logic units are generated, the mechanism makes the logic units available to the user of the plurality of storage device managers (step 410). Depending on the setting of the particular storage device manager, the mechanism may push the logic units to the storage device manager and notify the user that the logic units are available to user (step 412) or notify the user of the storage device manager that new logic units are available and then the user may select particular one of the logic units that are most applicable to the user to download to their storage device manager (step 414). From steps 412 or 414, the operation ends.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for utilizing analytics data to generate crowd-based custom logic units for use by other in their storage management. That is, the mechanisms analyze the analytics data gathered from a plurality of users using storage device managers in order to gain community insights. Using the community insights, the mechanisms generate community knowledge-based procedures, herein after referred to as "Logic Units" that are then integrated back into the storage device managers as plugins. These plugins may then be searched by the user of the storage device manager to perform their daily tasks more efficiently.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and a memory coupled to the at least one processor, for generating crowd-based custom logic units for use in storage management, the method comprising:

responsive to receiving analytic data from a set of storage device managers on a set of customer devices about how users interact with a set of storage devices on the set of customer devices managed by a respective storage device manager, analyzing the analytics data in order to gain one or more insights into how users interact with the set of storage devices using the respective storage manager;

utilizing the one or more insights, generating one or more logic units that will allow the users to perform their daily tasks more efficiently; and transmitting the one or more logic units to one or more storage device managers in the set of storage device managers so that the one or more storage device managers integrate the one or more logic units and the users of the one or more storage device managers and the respective set of storage devices on the set of customer devices utilize the one or more logic units to perform their daily tasks more efficiently.

2. The method of claim 1, wherein the analytic data includes interactions with the respective storage device manager performed by the user and results obtained based on the interactions with the respective storage device manager thereby allowing for mimicking the same interactions on one or more other unrelated systems.

3. The method of claim 1, each logic unit of the one or more logic units is at least one of a plug-in, plugin, addin, add-on, addon, or other extension that is a software component that adds a specific feature to the one or more storage device managers.

4. The method of claim 1, wherein sending the one or more logic units to one or more storage device managers in the set of storage device managers comprises:
   pushing the one or more the logic units to the one or more storage device managers; and
   notifying a user of each of the one or more storage devices managers that the one or more logic units are available.

5. The method of claim 1, wherein sending the one or more logic units to one or more storage device managers in the set of storage device managers comprises:
   notifying each user of the one or more storage device managers that one or more logic units are available; and
   responsive to the user selecting a particular one of the one or more logic units, downloading the selected logic unit to the respective storage device manager.

6. The method of claim 1, wherein analyzing the analytics data in order to gain the one or more insights further comprises:
   grouping the analytic data based on a result obtained.

7. The method of claim 1, wherein the one or more insights comprises at least one of identifying common usage patterns, identifying user characteristics, identifying methods or routes performed by the users to obtain a same result, identifying common cases and responses, or identifying common actions blocks that preform a same flow.

8. A computer program product comprising a computer readable storage medium having a computer readable program stored therein, wherein the computer readable program, when executed on a computing device, causes the computing device to:
   responsive to receiving analytic data from a set of storage device managers on a set of customer devices about how users interact with a set of storage devices on the set of customer devices managed by a respective storage device manager, analyze the analytics data in order to gain one or more insights into how users interact with the set of storage devices using the respective storage manager;
   utilizing the one or more insights, generate one or more logic units that will allow the users to perform their daily tasks more efficiently; and
   transmit the one or more logic units to one or more storage device managers in the set of storage device managers so that the one or more storage device managers integrate the one or more logic units and the users of the one or more storage device managers and the respective set of storage devices on the set of customer devices utilize the one or more logic units to perform their daily tasks more efficiently.

9. The computer program product of claim 8, wherein the analytic data includes interactions with the respective storage device manager performed by the user and results obtained based on the interactions with the respective storage device manager thereby allowing for mimicking the same interactions on one or more other unrelated systems.

10. The computer program product of claim 8, each logic unit of the one or more logic units is at least one of a plug-in, plugin, addin, add-on, addon, or other extension that is a software component that adds a specific feature to the one or more storage device managers.

11. The computer program product of claim 8, wherein the computer readable program to send the one or more logic units to one or more storage device managers in the set of storage device managers further causes the computing device to:
    push the one or more the logic units to the one or more storage device managers; and
    notify a user of each of the one or more storage devices managers that the one or more logic units are available.

12. The computer program product of claim 8, wherein the computer readable program to send the one or more logic units to one or more storage device managers in the set of storage device managers further causes the computing device to:
    notify each user of the one or more storage device managers that one or more logic units are available; and
    responsive to the user selecting a particular one of the one or more logic units, download the selected logic unit to the respective storage device manager.

13. The computer program product of claim 8, wherein the computer readable program to analyze the analytics data in order to gain the one or more insights further causes the computing device to:
    group the analytic data based on a result obtained.

14. The computer program product of claim 8, wherein the one or more insights comprises at least one of identifying common usage patterns, identifying user characteristics, identifying methods or routes performed by the users to obtain a same result, identifying common cases and responses, or identifying common actions blocks that preform a same flow.

15. An apparatus comprising:
    a processor; and
    a memory coupled to the processor, wherein the memory comprises instructions which, when executed by the processor, cause the processor to:
    responsive to receiving analytic data from a set of storage device managers on a set of customer devices about how users interact with a set of storage devices on the set of customer devices managed by a respective storage device manager, analyze the analytics data in order to gain one or more insights into how users interact with the set of storage devices using the respective storage manager;
    utilizing the one or more insights, generate one or more logic units that will allow the users to perform their daily tasks more efficiently; and
    transmit the one or more logic units to one or more storage device managers in the set of storage device managers so that the one or more storage device managers integrate the one or more logic units and the users of the one or more storage device managers and the respective set of storage devices on the set of customer devices utilize the one or more logic units to perform their daily tasks more efficiently.

16. The apparatus of claim 15, wherein the analytic data includes interactions with the respective storage device manager performed by the user and results obtained based on the interactions with the respective storage device manager thereby allowing for mimicking the same interactions on one or more other unrelated systems.

17. The apparatus of claim 15, each logic unit of the one or more logic units is at least one of a plug-in, plugin, addin, add-on, addon, or other extension that is a software component that adds a specific feature to the one or more storage device managers.

18. The apparatus of claim 15, wherein the instructions to send the one or more logic units to one or more storage device managers in the set of storage device managers further cause the processor to:
  push the one or more the logic units to the one or storage device managers; and
  notify a user of each of the one or more storage devices managers that the one or more logic units are available.

19. The apparatus of claim 15, wherein the instructions to send the one or more logic units to one or more storage device managers in the set of storage device managers further cause the processor to:
  notify each user of the one or more storage device managers that one or more logic units are available; and
  responsive to the user selecting a particular one of the one or more logic units, download the selected logic unit to the respective storage device manager.

20. The apparatus of claim 15, wherein the instructions to analyze the analytics data in order to gain the one or more insights further cause the processor to:
  group the analytic data based on a result obtained.

* * * * *